(12) United States Patent
Ledenev et al.

(10) Patent No.: US 8,793,207 B1
(45) Date of Patent: Jul. 29, 2014

(54) SYSTEM AND METHOD FOR ADAPTIVE CONTROL OF USER ACTIONS BASED ON USER'S BEHAVIOR

(71) Applicant: Kaspersky Lab ZAO, Moscow (RU)

(72) Inventors: Alexander V. Ledenev, Moscow (RU);
Evgeny B. Kolotinsky, Moscow (RU);
Konstantin S. Ignatyev, Moscow (RU)

(73) Assignee: Kaspersky Lab ZAO, Moscow (RU)

( * ) Notice: Subject to any disclaimer, the term of this patent is extended or adjusted under 35 U.S.C. 154(b) by 0 days.

(21) Appl. No.: 13/749,266

(22) Filed: Jan. 24, 2013

(51) Int. Cl.
*G06F 19/24* (2011.01)

(52) U.S. Cl.
USPC .............................................. 706/47

(58) Field of Classification Search
None
See application file for complete search history.

(56) References Cited

U.S. PATENT DOCUMENTS

| | | | |
|---|---|---|---|
| 7,046,139 B2 | 5/2006 | Kuhn et al. | |
| 7,600,019 B2 | 10/2009 | Reasor et al. | |
| 7,739,707 B2 | 6/2010 | Sie et al. | |
| 7,809,797 B2 | 10/2010 | Cooley et al. | |
| 7,899,901 B1 | 3/2011 | Njemanze et al. | |
| 8,077,688 B2 | 12/2011 | Zhang | |
| 8,122,137 B2 | 2/2012 | Appelman et al. | |
| 8,166,535 B2 | 4/2012 | Coburn | |
| 2004/0221303 A1 | 11/2004 | Sie et al. | |
| 2005/0203881 A1 | 9/2005 | Sakamoto et al. | |
| 2005/0240959 A1 | 10/2005 | Kuhn et al. | |
| 2006/0236395 A1 | 10/2006 | Barker et al. | |
| 2008/0201469 A1 | 8/2008 | Reasor et al. | |
| 2009/0100513 A1 | 4/2009 | Coburn | |
| 2010/0235923 A1 | 9/2010 | Schepis et al. | |
| 2011/0034242 A1 | 2/2011 | Aronzon et al. | |

FOREIGN PATENT DOCUMENTS

| | | | |
|---|---|---|---|
| EP | 1944676 A1 * | 7/2008 | ............... G09F 9/46 |
| GB | 2350211 A | 11/2000 | |
| WO | 2008/046807 A1 | 4/2008 | |

OTHER PUBLICATIONS

Bailey, C., Chadwick, D., and Lemos, R. "Self-Adaptive Authorization Framework for Policy Based RBAC/ABAC Models" on the 2011 IEEE Ninth International COnference on Dependable Autonomic and Secure Computing.*

(Continued)

*Primary Examiner* — Kakali Chaki
*Assistant Examiner* — Michael Zidanic
(74) *Attorney, Agent, or Firm* — Arent Fox LLP; Michael Fainberg

(57) ABSTRACT

Disclosed are system, method and computer program product for adaptive control of actions of a user on a computer system. The system monitors one or more actions of the user, applies restriction rules to detect prohibited user actions, and blocks prohibited actions that violate at least one restriction rule. The system also collects information on allowed actions of the user and corresponding system events, analyzes in real-time the collected information about system events corresponding to the allowed actions to detect anomalous actions that did not violate any of the restriction rules, but caused abnormal increase in the usage of certain system resources. When an anomalous action is detected, the system identifies restriction rules that are associated with the detected anomalous action and edits these rules or creates new restriction rules to include the anomalous action prohibited to the user.

21 Claims, 5 Drawing Sheets

(56) References Cited

OTHER PUBLICATIONS

Bailey, Chadwick and Lemos. "Self-Adaptive Authorization Framework for Policy Based RBAC/ABAC Models" 2011 IEEE Ninth International COnferences on Dependable, Automatic and Secure Computing.*

European search report from counterpart EP Application No. 13155736.5.

Christopher Bailey et al, "Self-Adaptive Authorization Frame for Policy Based RBAC/ABAC Models", Ninth International Conference on Dependable, Autonomic and Secure Computing, Dec. 2011 IEEE, pp. 37-44, S Canterbury, UK.

* cited by examiner

SYSTEM AND METHOD FOR ADAPTIVE CONTROL OF USER ACTIONS BASED ON USER'S BEHAVIOR

TECHNICAL FIELD

The present disclosure generally relates to the field of computer security, and specifically to systems, methods and computer program products for adaptive regulation and control of the user actions on the basis of the user's behavior.

BACKGROUND

The Internet has become an indispensible part of life for a large part of world's population. The Internet provides a bottomless source of information as well as a medium for communication through social networking, chats, instant messaging and e-mail. The internet is also used for shopping, paying bills, playing games, watching videos, and other activities. Some types of information available on the Internet is oriented towards the adult population. In other words, that information is not for the children and teenagers. This information can be pornographic material, which can be usually found on dating sites, adult video sites and elsewhere. Of course, this kind of resources should not be available to children.

With every year, children and teenagers visit the Internet more often, as they are eager to get to know and to use all that it has to offer. The Internet allows children to learn, to develop and to network socially. Yet, young Internet users often do not have adequate understanding of all the information available on the Internet, since this information is often not verified or lacks desired quality. Some data may even be dangerous and harmful to the children. Therefore, there is a need to control children's access to information in cyberspace.

This need is currently addressed using parental control systems. The main tasks of these systems are the protection of children from the threats associated with children's work with computers and access to the Internet, as well as control over time that children are allowed to spend on the Internet, playing computer games, or watching videos. Parental control systems generally allow parents to formulate flexible restriction rules that control children's access to Internet and software running on their computers. In addition, parental control systems can create reports of actions performed by the computer users. These report are shown to the user-administrator (who could be a parent, for example), so that the user can stay informed of the actions performed by children and, if necessary, edit the restriction rules.

However, modern parental control systems may inadequately respond to anomalous user action. Anomalous actions are those that should be prohibited to the user, but not blocked by restriction rules for one or more of the following reasons: the administrator forgot to create a rule covering the anomalous action; the administrator was not thorough in formulating restriction rules and missed the anomalous action; or the administrator was not aware of the possibility of blocking the prohibited application or content. Parental control systems are configured to block user actions specifically described by the restriction rules that were formulated before a user performs any anomalous actions. The performed anomalous actions will be reported to the parent/administrator post factum. And only after reviewing the report, the administrator can edit restriction rules to cover prohibited anomalous actions. Thus, if the user finds a way to circumvent restriction rules, then the time for the system to block user actions can be great, since it depends on the reaction of the administrator.

There are other defects of the current parental control systems. For example, they require the administrator to be competent and able to understand reports generated by the system, so he/she can make changes to the restriction rules or create new rules. Also, they do not consider information from external data source. When there is a complete automation of different teaching methods, the external data may come from a school, for example, or from another institution of learning. An example of the external data could be the information that was received as a report or as a grade from a teacher. This kind of information could serve as a basis for access regulation that gives to the child user either more or less leeway.

Therefore, there is a need for parental control system with adaptive regulation of user's access to the computer and Internet resources based on user's behavior.

SUMMARY

Disclosed are system, method and computer program product for adaptive, real-time regulation and control of the user actions on the basis of the user's behavior. In one example implementation, a system for adaptive control of user actions monitors actions of the user on the computer and applies restriction rules that detect prohibited actions of the user. The system further blocks prohibited actions of the user that violate at least one restriction rule, collects information about allowed actions of the user and system events corresponding to the allowed user actions, and analyzes in real-time the collected information about system events corresponding to the allowed actions of the user to detect anomalous actions of the user. An anomalous action of the user does not violate any of the restriction rules, but causes one or more of an abnormal increase in the usage of certain system resources, loading of certain content, launching of certain application, and usage of a data entry device. When an anomalous action of the user is detected, the system identifies whether one or more restriction rules is associated with the detected anomalous action. When no associated restriction rule is identified, the system allows execution of the anomalous action of the user on the computer system. When an associated restriction rules is identified, the system edits the associated restriction rule or creates a new restriction rule to include the anomalous action prohibited to the user, and blocks the anomalous action on the computer system.

The above simplified summary of example embodiment(s) serves to provide a basic understanding of the invention. This summary is not an extensive overview of all contemplated aspects of the invention, and is intended to neither identify key or critical elements of all embodiments nor delineate the scope of any or all embodiments. Its sole purpose is to present one or more embodiments in a simplified form as a prelude to the more detailed description of the invention that follows. To the accomplishment of the foregoing, the one or more embodiments comprise the features described and particularly pointed out in the claims.

BRIEF DESCRIPTION OF THE DRAWINGS

The accompanying drawings, which are incorporated into and constitute a part of this specification, illustrate one or more example embodiments of the invention and, together with the detailed description, serve to explain their principles and implementations.

In the drawings.

DETAILED DESCRIPTION OF EXAMPLE EMBODIMENTS

Example embodiments of the present invention are described herein in the event context of systems, methods and computer program products for adaptive regulation and control of the user actions based on user's behavior implemented as part of a parental control system. Those of ordinary skill in the art will realize that the following description is illustrative only and is not intended to be in any way limiting. Other embodiments will readily suggest themselves to those skilled in the art having the benefit of this disclosure. Reference will now be made in detail to implementations of the example embodiments as illustrated in the accompanying drawings. The same reference indicators will be used to the extent possible throughout the drawings and the following description to refer to the same or like items.

Most modern parental control system are typically deployed on personal computers, firewalls or remote servers and often include a complex of software components that control either user actions (usually those of children users) or events that take place as a result of said user actions, and, as specified by restriction rules, block or allow said actions and/or events.

Figure 1:
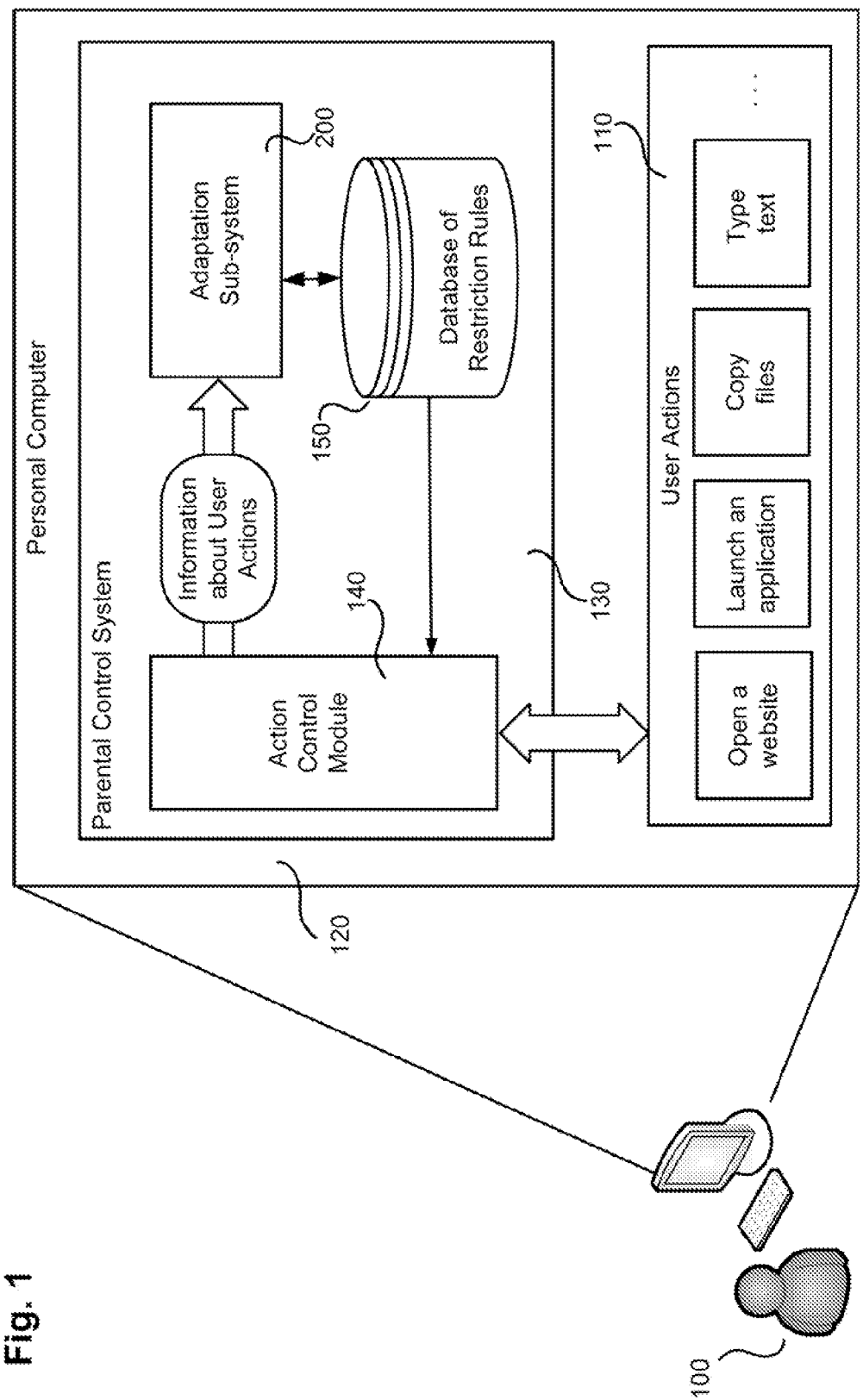
FIG. 1 illustrates an example embodiment of a parental control system.

FIG. 1 is an example embodiment of a parental control system 130 in which systems and methods for adaptive regulation and control of user actions based on user's behavior can be implemented. The system 130 may be implemented as a stand-alone software application or a component of a security software suite, such as Kaspersky Internet Security, and be installed on a personal computer 120, or other type of computing device, such as notebook computer, tablet computer, smartphone, network server, network firewall or the like. The system 130 may be configured to control actions 110 of one or more users 100 of the computer 120. The users 100 can include children or anyone whose actions should be controlled and who do not have administrative privileges on computer 120. Most typical actions controlled by system 130 include, but not limited to Internet browsing (e.g., visiting certain websites and viewing certain Web content), downloading/installing/launching applications (e.g., computer games); and working with data (e.g. reading, writing, deleting or editing files).

In order to control user actions, the parental control system 130 includes a plurality of action control modules 140, which facilitate different types of control. For example, one module 140 may be responsible for automatically taking and storing screen shots of information displayed on the computer 120 in order to present them later to the administrator (e.g., a parent). Another module 140 may control user's communication exchanges made via instant messaging applications. This control is performed by listening to communication ports and analyzing protocols, such as MSNP, AIM/ICQ and XMPP (Jabber). Yet another module 140 may be responsible for the control of the websites, which are either being visited or could be visited by the user 100. This can be done, for example, by monitoring HTTP and HTTPS protocols. Another module 140 may control the display of undesirable information on websites visited by the user 100. For instance, it searches for the word "erotic" and blocks display of the website, if this word is listed in a rule that blocks this content. There may be also another module 140 that controls downloading of programs and applications, which can be done via names or hashsum of the downloaded files. There may also be other modules 140 that control different system events on the computer, such as printing of files, writing the files onto optical drives, opening of web pages, and so on. Also, there may be other modules 140 that collect information from various performance analyzers of the OS of the user computer 120.

The action control modules 140 operate by preemptively prohibiting (e.g., blocking) certain user actions 110, such as visiting prohibited websites or loading prohibited application on the computer 120. The blocking of user actions occurs when a restriction rule, which is responsible for the blocking of the detected prohibited action, is activated. The restriction rules are stored in the rules database 150. This database 150 may be created by the user-administrator. The administrator can either personally create new restriction rules or use restriction rules from external sources. For example, an external source can be a database containing lists of allowed or prohibited websites. Another example is a database containing rules of allowed and prohibited actions. This database can be created with the help of a security software developing company, such as Kaspersky Lab. During operation of the system 130, the database 150 with all the rules contained therein is available for use to modules 140.

One should note, that during its operation, the system 130 creates a report about all actions performed by user 100 and system events that occurred in response to the performed user actions, and it also creates reports about user's attempts to violate one or more restriction rules from database 150. As a result, the administrator is always informed about what the user 100 does on the computer 120 and, consequently, the administrator can respond to the detected user actions 110 by either editing an existent restriction rule or creating a new one.

In one example embodiment, the parental control system 130 includes an adaptation sub-system 200 that performs real-time editing of restriction rules based on user's behavior. Generally, during its operation, the adaptation sub-system 200 receives from action control module(s) 140 information about user actions, resulted system events, and activated restriction rules (if any). The adaptation sub-system 200 analyzes the received information and identifies anomalous actions, which were allowed, but should have been prohibited to the user by the system 130. The adaptation sub-system 200 retrieves relevant restriction rules from database 150 and edits these restriction rules to block anomalous actions. If no relevant restriction rule exists in the database 150, then sub-system 200 can create new restriction rules. Afterwards, the sub-system 200 updates the new and edited rules in the database 150.

Figure 2:
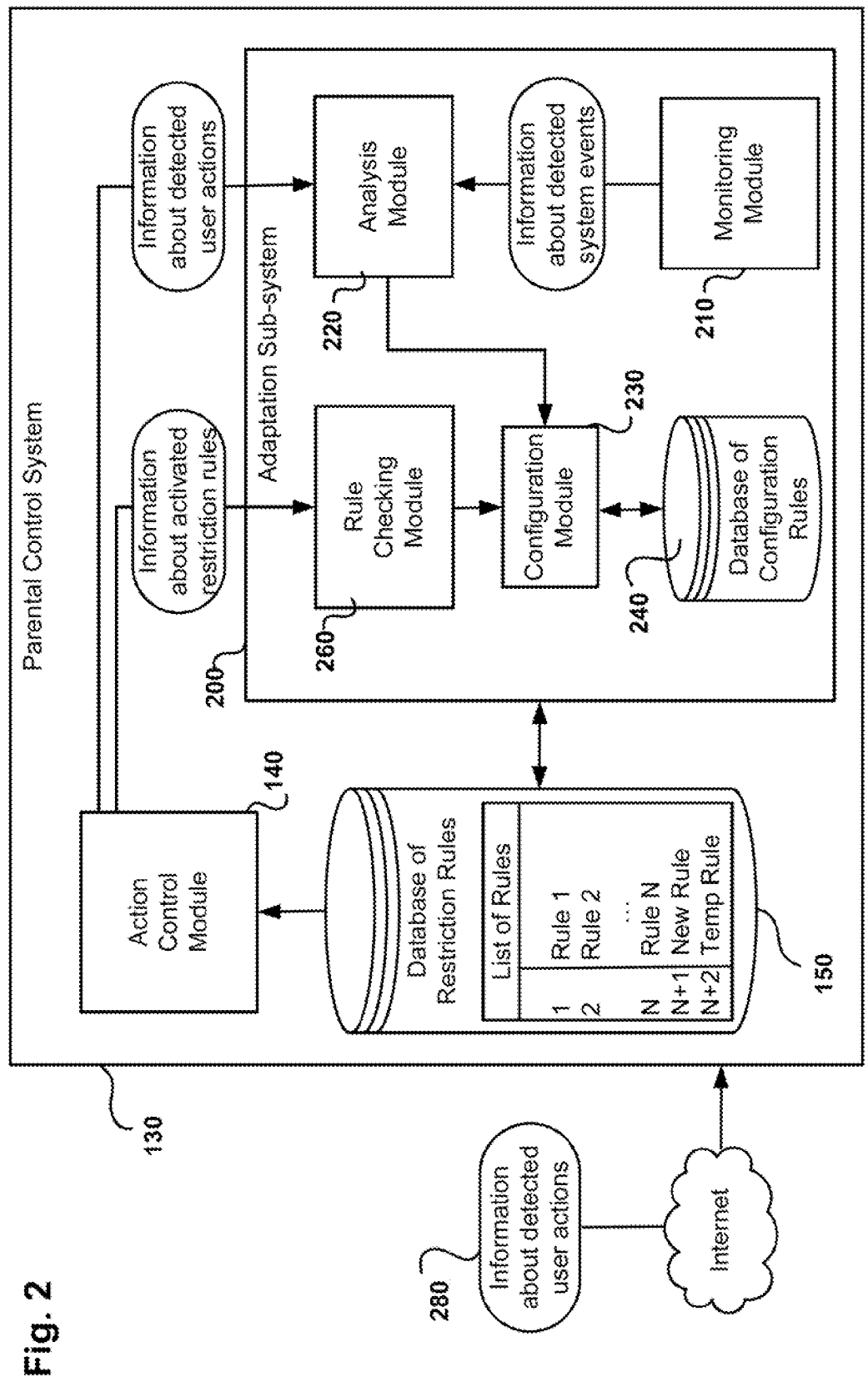
FIG. 2 illustrates an example embodiment of the adaptation sub-system of the parental control system.

FIG. 2 shows one example embodiment of the adaptation sub-system of the parental control system. The adaptation sub-system 200 includes a monitoring module 210, analysis module 220, rules configuration module 230, configuration rules database 240, and rules checking module 260. In one example implementation, the monitoring module 210 collects information about all system events that took place during the work of the user 100 on the computer 120. For example, the monitoring module 210 collects the information on the detected operating system (OS) events caused by actions of the user 100. After that, the monitoring module 210 forwards the collected information to the analysis module 220.

In one example implementation, the analysis module 220 receives information from the control module(s) 140 and monitoring module 210. The information received from the modules 140 may include the report on all actions performed by the user 100 on the computer 120 as well as information about activated restriction rules. The information received from the monitoring module 210 may include the report on all OS events (e.g., API function calls) during and after the actions initiated by the user 100. Examples of such events and actions may include, but not limited to: increase in the usage of the central processor (CPU); increase in the usage of the physical memory; increase in the usage of the graphic processor (GPU); execution of a full-screen application; increase in the exchange of network packets; launching of an application; downloading of a file from the Internet; loading of a webpage; usage of the data entry device (e.g., mouse or keyboard); use of audio programs; loading of certain content (e.g., HTML, flash, etc.) and other events.

In one example implementation, the analysis module 220 analyses received information by identifying relationships between the actions performed by the user 100 and the associated OS events. An example of a relationship is a connection between the action of the user and OS event(s) that occurred within a certain time period (e.g., several milliseconds). For example, if the user 100 launched a game application, then the analysis module 220 would receive information from the modules 140 about this action of the user, and also the information from the monitoring module 210 on the following activities: increase in file activity and usage of CPU and/or GPU. Since the detected user action (e.g., a double click by the mouse on a application icon) and the consequent events mentioned above occurred within a short period of time, then the analysis module 220 is able to identify a connection between them, i.e., that the events came as the result of the said user action. Another example of a relationship between actions and corresponding events would be the connection that was determined based on information obtained by various system performance analyzers, which typically measure different metrics of the OS and hardware resource usage in the computer 120.

On the basis of the received information, the analysis module 220 collects a context (e.g., a data structure containing a viewable list of information items), which it sends to the regulating module 230. One should note, that the event context may be generated in real-time and sent as the new data (events and/or actions) comes in. Depending on the implementation, the context may contain: the detailed information (with different levels of detail) about the actions of the user; the information about the events corresponding to the action of the user; the duration of the events (e.g., loading of the CPU); and additional information about events, such as the information about a file that executed a process that increases usage of CPU and/or GPU; the information about visited websites and their content (e.g., the sites' addresses, the contact information from the social networks, etc.); the information about connected peripheral devices and their usage.

In one example implementation, the configuration module 230 performs configuration and updating of the rules database 150. The configuration of the rules database 150 includes editing of the restriction rules it contains, or the creation of the new restriction rules that would be added to the rules database 150. The configuration module 230 analyses the given context in order to find an anomalous action of the user 100. As explained above, an anomalous action is an action that should be prohibited to the user under control (e.g. child), but has not been blocked by any of the restriction rules from the database 150. In other words, the parental control system 130 failed to block a prohibited user action.

Following are several examples of anomalous user actions:

1. Actions meant to gain control over the operating system, which are typically allowed only to the users who have administrative rights on the system. Such actions can include, but not limited to: attempting to launch or install an application, which belongs to the category of the system programs; attempting to change the process of OS' loading or making changes to the BIOS; making new partitions on the hard drive; installing a driver; attempting to delete or change the parental control system 130, if it is implemented as a separate program; attempting to add a new administrative user or change administrative privileges of the existing user; attempting to load OS in the safe mode.

2. Actions directed towards operation of an application, which would be unknown, since the parental control system 130 could not determine the category of these actions. Therefore, the user 100 can gain access to the Internet or play a computer game, as an access to an unknown application is not prohibited. An example of such actions would be an attempt to launch a special or a changed program, such as a game or the Web browser.

3. Actions discovered via secondary indications or via an aggregate of different indications. For example, the secondary indications of launching of a game applications can include, but not limited to: accessing known gaming websites; accessing game's files; creating an objects of synchronization that are unique to the game; monitoring prolonged operation of one of the programs in a half-screen mode; abnormal (e.g., high or more than normal) usage of the computer resources, such as that on central processor (CPU) or graphic processor (GPU); detection of a certain data entry profile by the user, such as the frequent use of keys WSAD, blank, E, Ctrl; and the application's uses certain APIs, such as Direct3D or OpenGL.

4. Actions performed in the Internet, including, but not limited to: actions at unknown websites, such as entry of information; actions of filling out forms; actions of registering at unknown websites and providing highly personal information, such as names and personal identification numbers; periodic requests of unknown/prohibited websites; browsing the Internet via proxy-servers or using an application that provides anonymity (such as Tor).

The analysis of the event context is done using configuration rules from the database of configuration rules 240. These rules contain general criteria for identifying types of prohibited actions, decisions on the type of action, and the template for the restriction rules. The templates may be used to create new restriction rules for a particular prohibited action. For instance, a configuration rule can contain logic for categorizing an unknown application (which was not categorized using existing restriction rules) into the "Games" category, if one or more of the following actions are performed by the unknown application: the application operates in the full-screen operation mode; the operation of the application leads to the abnormal (high) usage of the CPU and GPU; a certain data entry profile is followed (such as the frequent use of keys WSAD, blank, E, Ctrl); and the application uses certain APIs, such as Direct3D or OpenGL. Based on these general criteria, the configuration module 230 can determine whether the application activated by the user falls into the category of "Games", and should be blocked. In another example, a configuration rule can contain logic for categorizing an unknown application into the "Browser" category, if one or more of the following actions are performed by the unknown application: entry of data from keyboard, opening of several windows, use of flash player, use of script interpreter (e.g., JavaScript); network activity (e.g., loading of files). Yet in another example, a configuration rule can contain logic for categorizing an unknown application into the "Video Player" category, if one or more of the following actions are performed by the unknown application: frequent reading of data from a disc, such as large data files; the application operates in full-screen mode; absence of user input for long periods of time; suspension of screen saver application, and other actions.

Therefore, the configuration module 230 compares the received event context with the configuration rules. In case one of the configuration rules was activated (i.e., violated), yet none of the restriction rules from the rules database 150 were activated in response to the detected action, then this action is potentially an anomalous one. Next, the configuration module 230 determines the presence of a restriction rule in the rules database 150, which corresponds to the template of the configuration rule that was activated. In case there is no restriction rule from the database 150, the potentially anomalous action may be considered to be permitted and is allowed to execute. The configuration module 230 returns to the analysis of the event context received from the analysis module 220. But in case when a corresponding restriction rule was found in the rules database 150, the potentially anomalous action is confirmed to be anomalous, since the identified restriction rule has not activated by any of the action control modules 140. Then, configuration module 230 decides how to deal with the detection anomalous action. Such a decision could be the editing of the existing restriction rules in the database 150 or creation of a new restriction rule, and adding it to the database 150. The decision whether to further update the database 150 would depend on the type of the discovered anomalous action and on the restriction rule that has not activated. The rules database 150 can be updated during the user's work on the computer 120 or afterwards.

In the case when a restriction rule from the rules database 150 is edited, then the configuration module 230 edits it in such a way that it would work next time, when the anomalous action is discovered. For instance, the rule would contain the feature of the discovered anomaly. Once this feature is detected, the rule would block that action.

Following are several examples of editing of restriction rules:

Example 1

The database 150 contains a restriction rule that prohibits launching of all Web browsers before 7 pm. The rule works on all browsers known to it. When the user 100 was working on the computer 120, the restriction rule detected anomalous user actions that pointed towards working with an unknown browser. Those anomalous actions were discovered by using the following criteria of actions and events: an unknown application was launched, raising Internet activity; the exchange of Internet packets increased significantly (e.g., several times more); the application requested informational resources at many URL addresses, which included either GET or POST inquiries. Hence, on the basis of the discovered anomalous actions, the configuration module 230 may edit the restriction rule responsible for restricting Internet browsing. In this case, the editing may involve addition of the feature of the new browser (such as a hashsum of the browser's file) to the corresponding restriction rule.

Example 2

This Example is similar to the Example 1. However, in this case, the restriction rule detected the usage of the unknown browser via HTTP traffic (GET and/or POST requests, for instance), while analyzing internet traffic. Hence, on the basis of the discovered anomalous actions, the configuration module 230 may edit the restriction rule responsible for restricting Internet browsing. In this case, the editing may involve addition of the feature of the new browser (such as a hashsum of the browser's file) to the corresponding restriction rule.

Example 3

The database 150 contains a restriction rule that prohibits access to certain websites (e.g., the rule contains a list of prohibited websites). These websites belong to the same category (e.g., websites with erotic content). If the user 100 has visited a website, which can also be categorized as a "websites with erotic content", then the configuration module 230 can add this particular website to the list of blocked websites, using the existing rule.

If the configuration module 230 decided to create a new restriction rule, then the new rule may be formulated based on the detected anomalous action, while using the restriction rule that was not activated (in other words, this would be the rule, which, in essence, should have been responsible for blocking of the detected anomalous action). Such decision will be made when the logic of the existing restriction rule does not allow to define and block all possible variations of the corresponding actions of the user 100 (which would happen, for instance, if the existing restriction rule from the rules database 150 needs to be constantly updated, otherwise it is easily circumvented). Once the new restriction rule, which imposes stricter restrictions than the one that has not activated, is generated, the configuration module 230 may add the new rule to the configuration rules database 150 to update it.

Following are several examples of operation of the configuration module 230:

Example 1

The database 150 contains a restriction rule prohibiting user 100 to play on-line games. The actions control module 140 uses this restriction rule to detect an anomalous action related to launching of an unknown on-line game. However, this action will be classified as prohibited by the configuration module 230 using a configuration rule that contains logic for categorizing an unknown on-line game to the "Games" category based on the following series of events: serious straining of the graphic processor (GPU), launching of a full-screen application, and significant exchange of the network packets. Also, the category of this application is undetermined. Therefore, the configuration module 230 creates a stricter restriction rule for blocking this anomalous action, such as, for instance, a rule that prohibits launching of applications that increase the usage of the graphic processor by 70%.

Example 2

The database 150 contains a restriction rule that prohibits launching of any kind of Web browser. The rule works on the basis of the policy that denies launching of all applications, whose hashsums are located in a database of hashsums of executable files. However, this restriction rule is not working properly since the configuration module 230 keeps constantly locate new versions of Web browsers. In this case, the configuration module 230 can decide to create a new restriction rule that would block all applications that send requests to the URL addresses, which would include all types of Web browsers.

Example 3

This Example is similar to the Example 2. If the configuration module 230 also determines that an existing restriction rule from the database 150 is being constantly modified (for instance, a new information about Web browsers, whose launching is prohibited before 7 pm, is constantly added), then it takes a decision to create a stricter rule, which would allow blocking of all further uses of Web browsers. Therefore, it adds a restriction rule to the database 150 that blocks all activity on the Internet that has to do with transmitting data over ports typically used by Web browsers, such as ports 80 or 8080. Thus, the user 100 cannot user browsers on computer 120, even if launched, as the standard http requests cannot be sent.

Example 4

The database 150 contains a restriction rule that prohibits access to certain websites (e.g., the rule has a complete list of prohibited sites). All these websites may belong to the same category (e.g., "sites with erotic content"). The definition of this category may be based on a series of rules analyzing the content of loaded web pages: for example, presence of a large number of images, flash video and little text may indicate a website containing erotic or pornographic material, while presence of a large quantity of text frequently entered/updated by the user, may indicate an online chat. In addition, categorization of a website based on the analysis of its content (e.g., text, images, etc.) may be performed using fuzzy logic, regular expressions, and other analysis methods. If the user 100 periodically visits a particular website that can also be categorized as "site with erotic content", then the configuration module 230 can change the existing rule of blocking content by making it stricter through prohibiting loading of all websites that contain erotic content. This example illustrates particularly well the addition to the incomplete configuration of the parental control system.

Example 5

The database 150 contains a restriction rule that prohibits communication with a number of contacts in social networks (e.g., online chat, IM). This restriction rule may use whitelists and blacklists for identify allowed/prohibited contacts. The contacts may be added to these lists based on a series of low-level rules, which analyze text from the unknown contact, contact's age, duration of the communication, etc.

In one example implementation, the configuration module 230 can create temporary restriction rules to restrict prohibited user actions that are repeated periodically.

Following are several examples of temporary restriction rules:

Example 1

The configuration module 230 periodically identifies certain actions that are directed towards launching of prohibited applications in an attempt to circumvent restriction rules responsible for blocking of these applications. In such case, the configuration module 230 may create a new temporary restriction rule that would block all actions of the user 100 until the user-administrator decides to remove this restriction rule. Therefore, a temporary restriction rule is going to be created and added to the rules database 150.

Example 2

The configuration module 230 found for the first time an anomalous user action directed towards launching of an application (a media player, for instance—even though there is a rule, limiting the opening of any media file). At the same time, the configuration module 230 determined that a restriction rule, responsible for this restriction, does not contain parameters prohibiting launching of a media player. Therefore, the configuration module 230 makes a decision to edit the restriction rule responsible for prohibiting this action. The editing may be performed by adding the hashsum of the unknown player to that restriction rule. Next, during the same working session, the configuration module 230 found another anomalous action directed towards launching of yet another unknown media player. In this case, the configuration module 230 makes a decision to create a restriction rule that would have a stricter restriction requirement. This new restriction rule would be added to the rules database 150. If, at the later time, the configuration module 230 discovers another anomalous action directed towards launching of a video player, then it can make a decision that would considerably limit actions of the user 100 on the computer 120, for example, only allowing access to known educational sites, using only one type of a Web browser.

In one example implementation, the created new restriction rule may have the status of a temporary rule.

In one example embodiment, a profile of the user 100 may be created based on information received from monitoring module 210. The profile may include information about programs used by the user, time duration that the computer was used, loaded/viewed media, visited websites, etc. Based on the profile information, the configuration module 230 may generate new restriction rules to be stored in the database 150. Such restriction rules may for example notify parent/administrator when user 100 was using computer for a certain period of time (e.g., from 7 to 9 pm) for one particular application only (e.g., Internet browsing) and at different times for other applications (e.g., gaming).

In one example implementation, during the analysis of the data received from the analysis module 220, the configuration module 230 detects actions of the user 100 that are allowed or positive. Positive actions include actions directed towards the education of the user (a child) 100, or the actions illustrating an absence of launching of the entertainment applications. For example, for several days the user 100 did not play computer games or did not go over the limit of the allotted time for the Internet usage. Other examples of positive actions are the use of the certain programs, which the administrator has marked as positive (for instance, an application that teaches a foreign language). Therefore, the configuration module 230 can decide to reward user 100 for consistent compliance with the administrator-imposed behavior expressed through the restriction rules. A temporary suspension or repeal of some of the restriction rules or editing the existent restriction rules in order to give more freedom of access to entertainment applications or Internet resources to the user 100, such as increasing the allowed time for game applications or access to entertainment websites.

In another example implementation, the configuration module 230 analyses the information 280 that has been received via the external sources in the Internet. The information 280 contains messages in regard of the actions/behavior of the user 100. An example of such information could be a report from the child's school teacher, describing the child's behavior and/or grades. This information may be received as a separate message (an e-mail, for instance) that was sent to the parental control system 130 via a special interface for the data exchange (e.g., XML interface with API functions for data exchange). The actions can be positive (for instance, the grade was good) or negative (for instance, the teacher reported bad behavior in class). So depending on the actions performed in school, the configuration module 230 can decide to edit the restriction rules by either making them stricter or more lax.

Also, in another example implementation, the adaptation sub-system 200 may include rule checking module 260 that analyzes performance of the new and edited restriction rules. For example, during a trial period, rule checking module 260 collects the statistical data on how effective are the either new or edited restriction rules, added to the rules database 150. Once the statistical data is collected, the module 260 analyses false responses. If no false responses were found, then the given rule becomes permanent. But if the restriction rules worked improperly, then the configuration module 230 is instructed to perform additional edits the restriction rule. The trial period may be regulated by the user-administrator or is determined by default. Also, the rule checking module 260 may send to the configuration module 230 information about activated restriction rules from the rules database 150.

In one example implementation, the rule checking module 260 can send requests to a cloud service in regard to the statistical data pertaining to the restriction rules that are being analyzed. This cloud service can be provided, for example, by Kaspersky Security Network. Cloud service contains statistics on various restriction rules. This statistical information is aggregated from different users and software development companies.

In one example implementation, the parent control system 130 can be connected to the analogous systems located on other devices of user 100. The connection can be a wired Ethernet or wireless, such as a Bluetooth, Wi-FI or NFC connection. In this case, the restriction rules of the rules database 150 can work on all of the connected user devices. Therefore, if some actions are going to be restricted on one device, then the same actions can be restricted on other user devices. For instance, if a restriction rule blocks user's access to social networking sites on one device (e.g., PC) because the user has exceeded his/her time allotment for a given day, then the same restriction will be applied on other devices (e.g., smartphone).

Figure 3:
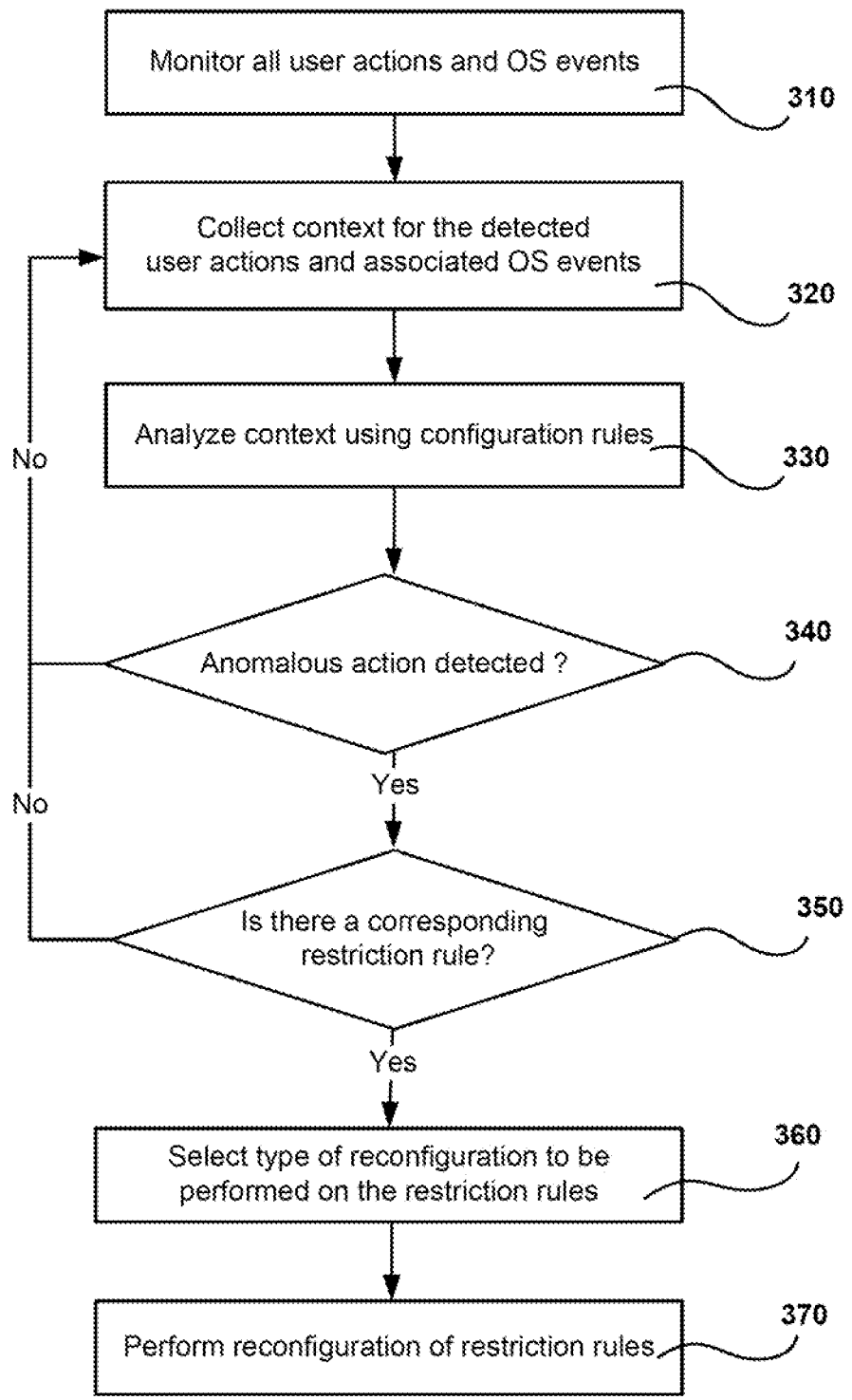
FIG. 3 illustrates an example method for adaptive reconfiguration of the parental control system.

FIG. 3 shows an example method of operation of adaptation sub-system for adaptive reconfiguration of the parental control system based on user's behavior. At step 310, the adaptation sub-system 200 receives from module(s) 140 information about actions performed by the controlled user 100 and information about activated restriction rules (if any) and from module 210 information about events that have occurred in the operating system (OS) during the work of the controlled user 100 on computer 120. At step 320, the received information is passed to the analysis module 220 that analyses this information to identify relationships between allowed user actions and detected OS events, and collects a context that contain information on all the performed (e.g., allowed) actions of the user 100 and all related OS events that occurred as a result of user actions. At step 330, context is passed to the configuration module 230 that analyses it using configuration rules from database 240 to identify anomalous actions. The configuration rules contain general criteria for identifying types of prohibited actions; the decision on the type of action; and the template for restriction rules. If at step 340, an anomalous action has been identified, the configuration module 230 determines at step 350 whether there is a restriction rules in the database 150 related to the anomalous user action.

Following is an example of analysis performed by the configuration module 230: The restriction rules in the database 150 may contain a following restriction rule: "Block the launching of the applications from the category 'Games' after 8 pm". The configuration module 230 finds in the event context it analyses the following allowed actions and associated events: an application has been launched (its category is undetermined); there has been an increase in the usage of the GPU and CPU's resources; also the API Direct3D has been used, and the application has been working in the full-screen regiment. Then, the configuration module 230 finds in the configuration rules database 240 the following configuration rule: "If context=<the context described above>, then the application belongs to the "Games" category". Also, this configuration rule may have additional conditions, such as, for example: If this anomalous action occurs for the first time (i.e. the parental control system failed to detect this game before), then the application is added to the "Games" category; If this anomalous action occurs more than once, then a temporary rule blocking launching of all applications except the allowed ones (if there are such) is created and is sent in the report to the administrator about activation of this condition; If the user attempts to launch the prohibited application several times (e.g., 5 times), then the rule above becomes permanent, and a report is sent to the administrator.

In case no restriction rule corresponding to the anomalous action was found at step 350, then the detected user action is not blocked (since the administrator has not put any limits on this type of action), and the configuration module 230 goes back to step 320 to get the next event context. In the case a corresponding restriction rule was found at step 350, then the discovered action is considered to be anomalous, as the restriction rule failed to block the discovered prohibited action. The anomalous action is the one that is considered to be prohibited to the user, but it has not been blocked by any of the restriction rules for that user.

Next, at step 360, the configuration module 230 selects the type of reconfiguration to be performed on the restriction rules. The type of reconfiguration is determined on the basis of the criteria of evaluating the possibilities of the editing the restriction rule. For instance, the evaluation criteria show that this restriction rule can be edited by adding to the rule the feature of the detected action, so that in the future, the rule will detect that action and block it accordingly. If the evaluation of possibility of editing of a rule showed that this rule cannot be edited, then the new restriction rule is going to be created. An example of this implementation is provided next: The parental control system contains, for example, at least two criteria of the user's restriction: "the lax restriction" and "the strict restriction". The type of restriction is imposed on the user's actions in accordance to the restriction rules, originally created by the administrator. If these restriction rules block all the actions that do not correspond to the list of the allowed ones, then it is a "strict restriction". If the restriction rules block only the websites with pornographic content, but the rest of the actions at the computer are allowed, then it is a "weak restriction". Therefore, depending on the type of restriction, new, stricter, restriction rules are going to be added to the database 150. Thus, if the type of restriction is defined as a "strict" one, then a new, even more severe, rule is going to be added in case of detecting an anomalous action. If the type of restriction is defined as a "weak" one, then the only restriction rule that is going to be edited will be the one responsible for the detected anomalous action. As it was described in the example above, the new restriction rule is going to have more severe parameters of restriction (of blocking the action), which are going to cover the detected anomalous action. Thus, at step 370, rules database 150 is updated with edited or new restriction rules, which prohibit anomalous user actions.

In one example implementation, the configuration module 230 may also identify positive actions performed by the user, while analyzing the received event context for anomalous behavior at steps 330-340. As explained above, the positive actions are directed towards the education of the user (a child) or illustrate the absence of launching of controlled applications. For instance, the user has not played computer games for several days. If the configuration module 230 identified a positive action, it can also update the rules database 150, but it would do so in order to decrease severity of restrictions. Thus, the rules database 150 may be changed in such a way, that the restriction rules it contains are going to be either weakened (i.e. the number of blocking criteria is going to lessen) or removed. For instance, the updating of the database 150 would increase the amount of time the user is allowed to use computer 120, or it would allow that user to use Web resources that were blocked earlier.

Yet in another example implementation, restriction rules may be created in advance in the database 150 based on a model of behavior of some "ideal" user 100. This model maybe based on statistically averaged actions of all known users 100, which would allow to create, such restriction rules, that will apply with various degree of likelihood to all future users 100.

In another example implementation, the configuration module 230 can designate a new restriction rules as temporary. In this case, the configuration module 230 can send a notice to the administrator to check the correctness of the new temporary rule. The administrator can, if necessary, correct the temporary rule and mark it as a permanent.

Figure 4:
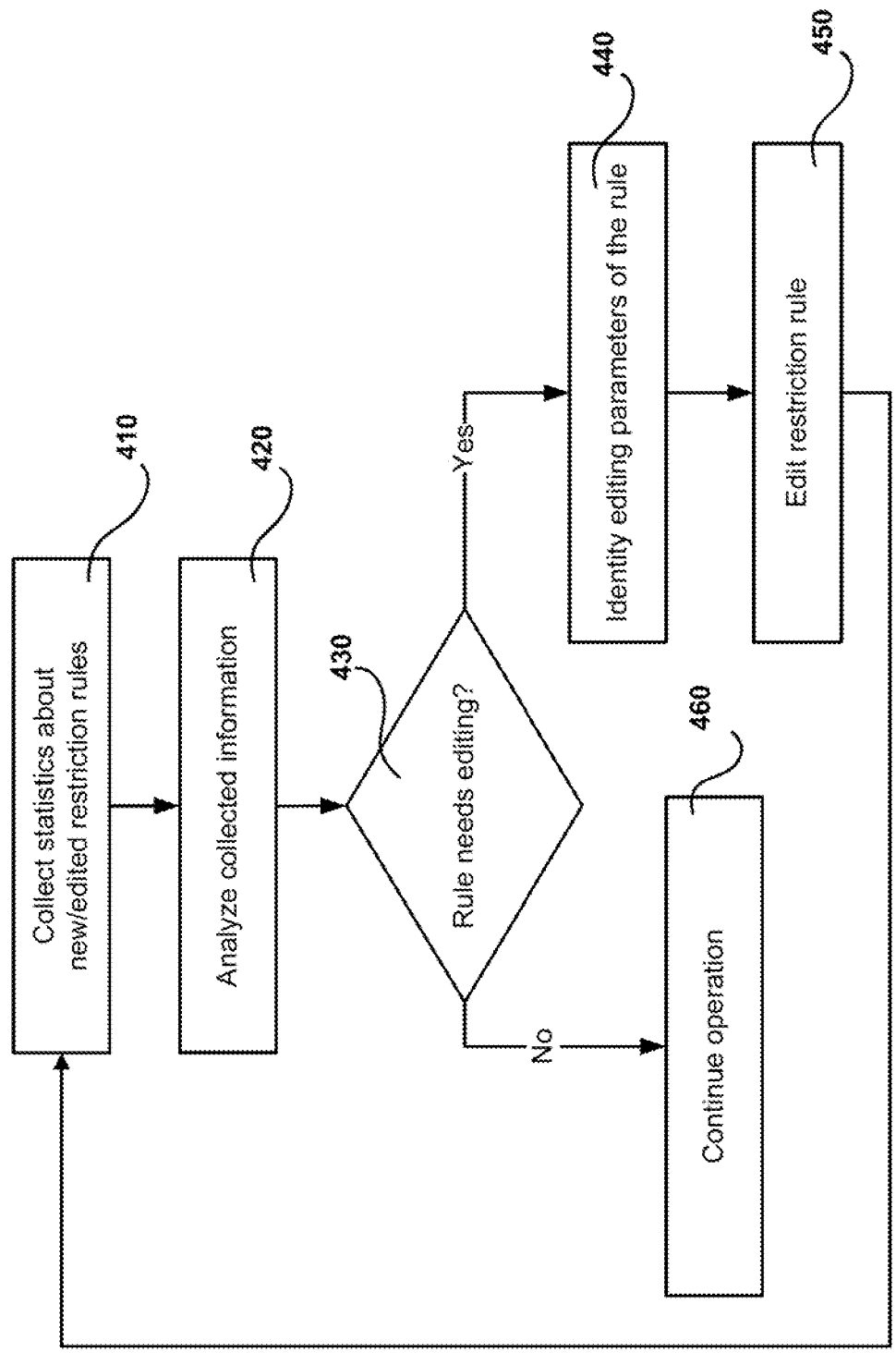
FIG. 4 illustrates one example method for checking correctness of restriction rules.

In another example implementation, the rule checking module 260 may be activated to analyze edited, new or temporary restriction rules for false responses. Operation of the rule checking module 260 is illustrated in FIG. 4. At step 410, the rule checking module 260 collects the statistical data on operation of restriction rules that were added to the rules database 150. The information on the rules can be collected either by monitoring reaction of the corresponding rules to the user actions or via an inquiry to a cloud service. At step 420, the rule checking module 260 analyzes the collected statistical data about the rule to identify false responses (e.g., when the rule blocks allowed actions of the user or allows prohibited actions). The determination of a false response can be done when user notifies administrator about incorrect operation of the parental control system, in which case the administrator may mark a particular rule as incorrect. Alternatively, the determination of a false response can be made by comparing blocked applications with the list of the legitimate ones via their hashsums. At step 430, the rule checking module 260 determines if the rule requires further editing. When editing is needed, at step 440, the parameters of the restriction rule that require editing are identified. Some of these parameters may be either edited or removed. Then, the editing parameters are sent to the configuration module 230. At step 450, the configuration module 250 would edit the corresponding restriction rule on the basis of the received information, and update the rules database 150 with the edited rule. If the added rule does not require editing, then at step 460, the edited/temporary/new status would be removed from this rule, and it becomes the permanent one, while the rule checking module 260 can continue its work.

Figure 5:
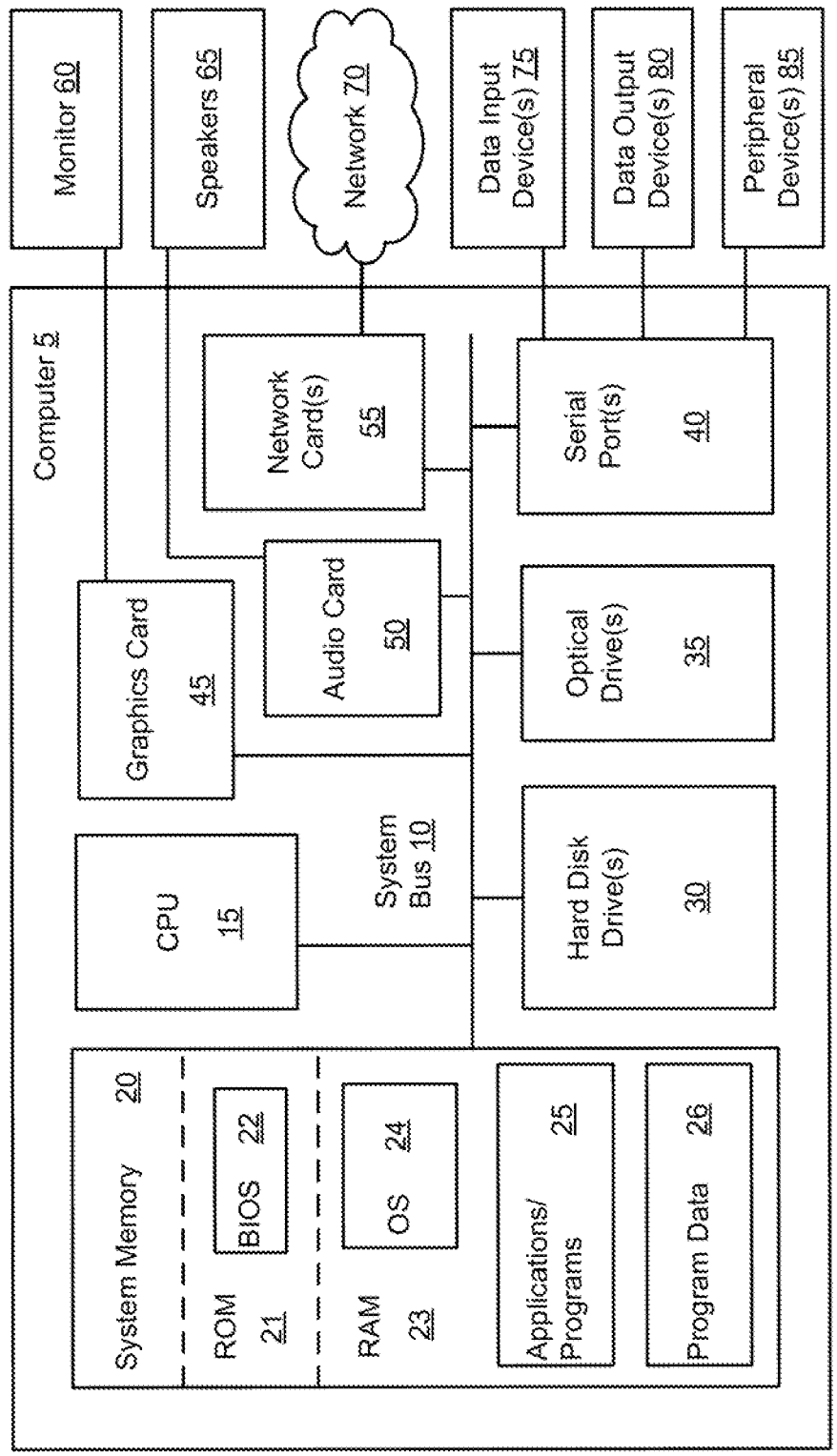
FIG. 5 illustrates a block diagram of a general-purpose computer suitable for implementing the parental control system and methods disclosed herein.

FIG. 5 is an example embodiment of a computer system 5, which could be used to implement the system and methods for adaptive control of user actions described herein. As shown, computer system 5 may include one or more hardware processors 15, memory 20, one or more hard disk drive(s) 30, optical drive(s) 35, serial port(s) 40, graphics card 45, audio card 50 and network card(s) 55 connected by system bus 10. System bus 10 may be any of several types of bus structures including a memory bus or memory controller, a peripheral bus and a local bus using any of a variety of known bus architectures. Processor 15 may include one or more Intel® Core 2 Quad 2.33 GHz processors or other type of microprocessor.

System memory 20 may include a read-only memory (ROM) 21 and random access memory (RAM) 23. Memory 20 may be implemented as in DRAM (dynamic RAM), EPROM, EEPROM, Flash or other type of memory architecture. ROM 21 stores a basic input/output system 22 (BIOS), containing the basic routines that help to transfer information between the components of computer system 5, such as during start-up. RAM 23 stores operating system 24 (OS), such as Windows® XP Professional or other type of operating system, that is responsible for management and coordination of processes and allocation and sharing of hardware resources in computer system 5. Memory 20 also stores applications and programs 25. Memory 20 also stores various runtime data 26 used by programs 25.

Computer system S may further include hard disk drive(s) 30, such as SATA magnetic hard disk drive (HDD), and optical disk drive(s) 35 for reading from or writing to a removable optical disk, such as a CD-ROM, DVD-ROM or other optical media. Drives 30 and 35 and their associated computer-readable media provide non-volatile storage of computer readable instructions, data structures, applications and program modules/subroutines that implement algorithms and methods disclosed herein. Although the exemplary computer system 5 employs magnetic and optical disks, it should be appreciated by those skilled in the art that other types of computer readable media that can store data accessible by a computer system 5, such as magnetic cassettes, flash memory cards, digital video disks, RAMs, ROMs, EPROMs and other types of memory may also be used in alternative embodiments of the computer system 5.

Computer system 5 further includes a plurality of serial ports 40, such as Universal Serial Bus (USB), for connecting data input device(s) 75, such as keyboard, mouse, touch pad and other. Serial ports 40 may be also be used to connect data output device(s) 80, such as printer, scanner and other, as well as other peripheral device(s) 85, such as external data storage devices and the like. System 5 may also include graphics card 45, such as nVidia® GeForce® GT 240M or other video card, for interfacing with a monitor 60 or other video reproduction device. System 5 may also include an audio card 50 for reproducing sound via internal or external speakers 65. In addition, system 5 may include network card(s) 55, such as Ethernet, WiFi, GSM, Bluetooth or other wired, wireless, or cellular network interface for connecting computer system 5 to network 70, such as the Internet.

In various embodiments, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a computer.

In the interest of clarity, not all of the routine features of the embodiments are disclosed herein. It will be appreciated that in the development of any actual implementation of the invention, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various embodiments disclosed herein encompass present and future known equivalents to the known components referred to herein by way of illustration. Moreover, while embodiments and applications have been shown and described, it would be apparent to those skilled in the art having the benefit of this disclosure that many more modifications than mentioned above are possible without departing from the inventive concepts disclosed herein.

The invention claimed is:

1. A method for adaptive control of user actions on a computer system, comprising:
    monitoring, by a hardware processor, one or more actions of the user on the computer system;
    identifying one or more prohibited actions of the user that violate one or more restriction rules;
    blocking prohibited actions of the user that violate one or more restriction rules;
    collecting information about allowed actions of the user and one or more system events corresponding to the allowed actions of the user;
    analyzing the collected information about system events corresponding to the allowed actions of the user using configuration rules to detect one or more anomalous actions of the user, wherein an anomalous action of the user does not violate any of the restriction rules, but causes one or more of an abnormal increase in the usage of certain system resources, loading of certain content, launching of certain application, and usage of a data entry device;
    when an anomalous action is detected based on a violation of at least one of the configuration rules, determining whether one or more restriction rules correspond to a template of at least one of the violated configuration rules;
    when no corresponding restriction rule is identified, allowing execution of the anomalous action of the user on the computer system;
    when a corresponding restriction rule is identified, (i) editing the corresponding restriction rule or creating a new restriction rule to include the anomalous action prohibited to the user, and (ii) blocking the anomalous action on the computer system; and
    when the new restriction rule is created: (i) collecting information on operation of the new restriction rule; (ii) analyzing the collected information on operation of the new restriction rule to determine whether the new restriction rule operates correctly; and (iii) if the new restriction rule does not operate correctly, editing the new restriction rule.

2. The method of claim 1, wherein analyzing the collected information about system events corresponding to the allowed actions of the user using configuration rules to detect anomalous actions that did not violate any of the restriction rules, but caused abnormal increase in the usage of certain system resources further includes:
    analyzing system events corresponding to the allowed actions of the user, including one or more of processor usage events, network usage events, and graphics usage events;
    identifying abnormal increases, above a threshold, in one or more of processor usage, network usage and graphics usage; and
    characterizing an allowed action of the user as anomalous when said action resulted in abnormal increase in usage of certain system resources.

3. The method of claim 2, further comprising:
    analyzing system events corresponding to the allowed actions of the user, including one or more data entry patterns and Application Program Interface (API) calls;
    identifying certain data entry patterns or certain API calls; and
    characterizing an allowed action of the user as anomalous when the action resulted in said certain data entry pattern or said certain API calls.

4. The method of claim 2, wherein analyzing system events corresponding to the allowed actions of the user further includes:
    determining whether the allowed actions of the user or corresponding system events violate one or more configuration rules,
    wherein a configuration rule includes: criteria identifying different types of system events; a decision determining whether one or more system events indicate a prohibited or allowed user action; and a template for creating new restriction rules that prohibit user actions.

5. The method of claim 1, further comprising:
    collecting information on operation of the edited restriction rules; and
    analyzing the collected information on operation of the edited restriction rules to determine whether the edited and new restriction rules operate correctly; and
    if the edited restriction rule does not operate correctly, further editing the rule.

6. The method of claim 1, wherein editing the corresponding restriction rule to include the anomalous action prohibited to the user further includes:
    identifying a restriction rule associated with the anomalous action of the user; and
    adding a descriptor of the prohibited action as a parameter of the restriction rule.

7. The method of claim 1 further comprising:
    identifying user's consistent compliance with one or more restrictions rules; and
    suspending the identified restrictions rule to reward the user for good behavior.

8. The method of claim 1, wherein the new restriction rule is a temporary rule that permits prohibited behavior after a predetermined period of time.

9. A computer system for adaptive control of user actions, comprising:
    a data storage for storing a plurality of restriction rules; and
    a processor coupled to the data storage, the processor being configured to:
        monitor one or more actions of the user on the computer system;

identify one or more prohibited actions of the user that violate one or more restriction rules;

block prohibited actions of the user that violate one or more restriction rules;

collect information about allowed actions of the user and corresponding system events;

analyze the collected information about system events corresponding to the allowed actions of the user using configuration rules to detect one or more anomalous actions of the user, wherein an anomalous action of the user does not violate any of the restriction rules, but causes one or more of an abnormal increase in the usage of certain system resources, loading of certain content, launching of certain application, and usage of a data entry device;

when an anomalous action is detected based on a violation of at least one of the configuration rules, determine whether one or more restriction rules correspond to a template of at least one of the violated configuration rules;

when no corresponding restriction rule is identified, allow execution of the anomalous action of the user on the computer system;

when a corresponding restriction rule is identified, (i) edit the corresponding restriction rule, or create a new restriction rule, to include the anomalous action prohibited to the user, and (ii) block the anomalous action on the computer system; and when the new restriction rule is created: (i) collecting information on operation of the new restriction rule; (ii) analyzing the collected information on operation of the new restriction rule to determine whether the new restriction rule operates correctly; and (iii) if the new restriction rule does not operate correctly, editing the new restriction rule.

10. The system of claim 9, wherein to analyze the collected information about system events corresponding to the allowed actions of the user using configuration rules to detect anomalous actions that did not violate any of the restriction rules, but caused abnormal increase in the usage of certain system resources, the processor further configured to:

analyze system events corresponding to the allowed actions of the user, including one or more of processor usage events, network usage events, and graphics usage events;

identify abnormal increases, above a threshold, in one or more of processor usage, network usage and graphics usage; and characterize an allowed action of the user as anomalous when said action resulted in abnormal increase in usage of certain system resources.

11. The system of claim 10, wherein the processor further configured to:

analyze system events corresponding to the allowed actions of the user, including one or more data entry patterns and Application Program Interface (API) calls;

identify certain data entry patterns or certain API calls; and characterize an allowed action of the user as anomalous when the action resulted in said certain data entry pattern or said certain API calls.

12. The system of claim 10, wherein to analyze system events corresponding to the allowed actions of the user, the processor further configured to:

determine whether the allowed actions of the user or corresponding system events violate one or more configuration rules, wherein a configuration rule includes: criteria identifying different types of system events; a decision determining whether one or more system events indicate a prohibited or allowed user action; and a template for creating new restriction rules that prohibit user actions.

13. The system of claim 9, wherein the processor further configured to:

collect information on operation of the edited restriction rules; and analyze the collected information on operation of the edited restriction rules to determine whether the edited and new restriction rules operate correctly; and if the edited restriction rule does not operate correctly, further edit the rule.

14. The system of claim 9, wherein to edit the corresponding restriction rule to include the anomalous action prohibited to the user, the processor further configured to:

identify a restriction rule associated with the anomalous action of the user; and add a descriptor of the prohibited action as a parameter of the restriction rule.

15. The system of claim 9, wherein the processor further configured to:

identify user's consistent compliance with one or more restrictions rules; and suspend the identified restrictions rule to reward the user for good behavior.

16. A computer program product embedded in a non-transitory computer-readable storage medium, the computer program product comprising computer-executable instructions for adaptive control of user actions, including instructions for:

monitoring one or more actions of the user on the computer system;

identifying one or more prohibited actions of the user that violate one or more restriction rules;

blocking prohibited actions of the user that violate one or more restriction rules;

collecting information about allowed actions of the user and one or more system events corresponding to the allowed actions of the user;

analyzing the collected information about system events corresponding to the allowed actions of the user using configuration rules to detect one or more anomalous actions of the user, wherein an anomalous action of the user does not violate any of the restriction rules, but causes one or more of an abnormal increase in the usage of certain system resources, loading of certain content, launching of certain application, and usage of a data entry device;

when an anomalous action is detected based on a violation of at least one of the configuration rules, determining whether one or more restriction rules correspond to a template of at least one of the violated configuration rules;

when no corresponding restriction rule is identified, allowing execution of the anomalous action of the user on the computer system;

when a corresponding restriction rule is identified, (i) editing the corresponding restriction rule or creating a new restriction rule to include the anomalous action prohibited to the user, and (ii) blocking the anomalous action on the computer system; and when the new restriction rule is created: (i) collecting information on operation of the new restriction rule; (ii) analyzing the collected information on operation of the new restriction rule to determine whether the new restriction rule operates correctly; and (iii) if the new restriction rule does not operate correctly, editing the new restriction rule.

17. The product of claim 16, wherein instructions for analyzing the collected information about system events corresponding to the allowed actions of the user using configuration rules to detect anomalous actions that did not violate any of the restriction rules, but caused abnormal increase in the usage of certain system resources further include instructions for:
- analyzing system events corresponding to the allowed actions of the user, including one or more of processor usage events, network usage events, and graphics usage events;
- identifying abnormal increases, above a threshold, in one or more of processor usage, network usage and graphics usage; and
- characterizing an allowed action of the user as anomalous when said action resulted in abnormal increase in usage of certain system resources.

18. The product of claim 17, further include instructions for:
- analyzing system events corresponding to the allowed actions of the user, including one or more data entry patterns and Application Program Interface (API) calls;
- identifying certain data entry patterns or certain API calls; and
- characterizing an allowed action of the user as anomalous when the action resulted in said certain data entry pattern or said certain API calls.

19. The product of claim 16, wherein instructions for analyzing system events corresponding to the allowed actions of the user further include instructions for:
- determining whether the allowed actions of the user or corresponding system events violate one or more configuration rules,
- wherein a configuration rule includes: criteria identifying different types of system events; a decision determining whether one or more system events indicate a prohibited or allowed user action; and a template for creating new restriction rules that prohibit user actions.

20. The product of claim 16, further include instructions for:
- collecting information on operation of the edited restriction rules; and
- analyzing the collected information on operation of the edited restriction rules to determine whether the edited and new restriction rules operate correctly; and
- if the edited restriction rule does not operate correctly, further editing the rule.

21. The product of claim 16, wherein instructions for editing the corresponding restriction rule to include the anomalous action prohibited to the user further include instructions for:
- Identifying a restriction rule associated with the anomalous action of the user; and
- adding a descriptor of the prohibited action as a parameter of the restriction rule.

* * * * *